March 8, 1938.  E. L. ROBINSON  2,110,679
ELASTIC FLUID TURBINE
Filed April 22, 1936
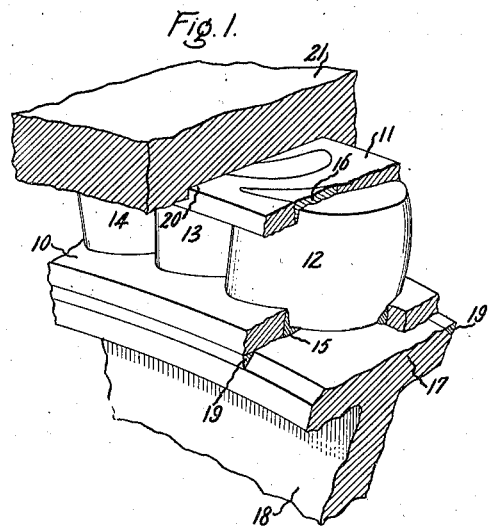
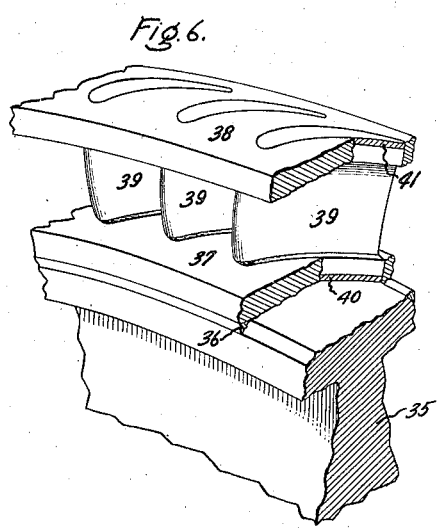
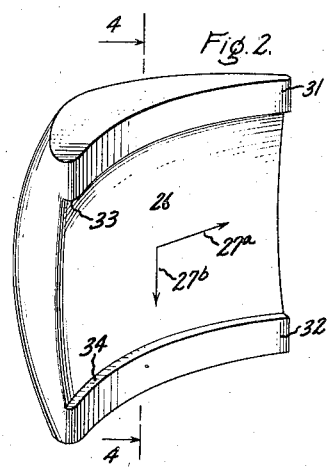
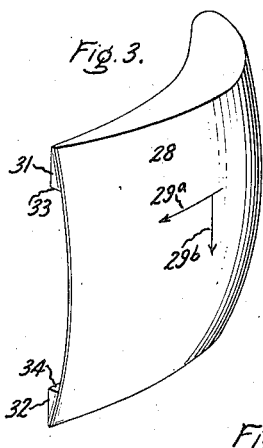
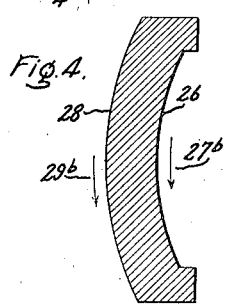
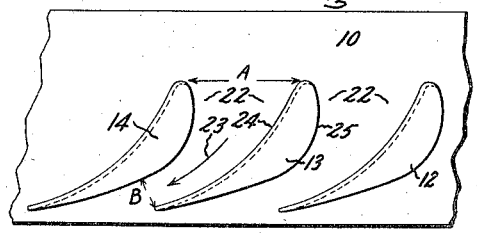
Inventor:
Ernest L. Robinson,
by Harry E. Dunham
His Attorney.

Patented Mar. 8, 1938

2,110,679

UNITED STATES PATENT OFFICE 2,110,679

ELASTIC FLUID TURBINE

Ernest L. Robinson, Schenectady, N. Y., assignor to General Electric Company, a corporation of New York Application April 22, 1936, Serial No. 75,765

5 Claims. (Cl. 253—77)

The present invention relates to elastic fluid turbines having stationary elements known as nozzle diaphragms forming passageways or nozzles for receiving, expanding and directing the flow of elastic fluid to rotatable elements known as bucket wheels. These bucket wheels usually comprise a disk with a ring of buckets secured thereto and defining passageways for receiving and directing the flow of elastic fluid and for converting a portion of the available energy of the fluid into mechanical energy. Whereas in impulse turbines expansion of the fluid is effected primarily on its way through the passages of the stationary nozzle diaphragm, in reaction type turbines such expansion of the fluid is also effected by the passages formed in the bucket wheel. The partitions, blades or buckets defining the aforementioned stationary and rotatable passageways for elastic fluid are subjected to differential pressures whenever expansion of the fluid is effected therethrough. These differential pressures set up high stresses in particular in the first stage or stages and may effect deformation of said partitions, blades or buckets, as will be more fully explained hereafter.

The object of the present invention is to provide an improved construction and arrangement of stationary and rotatable turbine elements defining passageways for elastic fluid in which expansion of the fluid is effected.

For a consideration of what I believe to be novel and my invention, attention is directed to the following description and the claims appended thereto in connection with the accompanying drawing.

In the drawing, Fig. 1 represents a stationary nozzle diaphragm for elastic fluid turbines embodying my invention; Figs. 2 and 3 are perspective views of a partition, blade or bucket embodying my invention; Fig. 4 is a sectional view along the line 4—4 of Fig. 2; Fig. 5 is a developmental view of the passageways defined by the diaphragm of Fig. 1; and Fig. 6 is a rotatable element or bucket wheel of an elastic fluid turbine embodying my invention.

The arrangement of Fig. 1 comprises a nozzle structure having an inner ring 10 and an outer ring 11 with a plurality of nozzle defining partitions 12, 13, 14 radially disposed between and secured to the inner and outer rings 10 and 11 respectively. In the present instance the inner ends of the partitions are integrally united with the inner rings by means of fused metal such as welds 15 and the outer ends of the partitions are united with the outer rings by welds 16. The inner ring 10 is secured to a rim 17 of a disk 18 by means of welds 19 and the outer ring 11 is held in a recess 20 of a stationary turbine casing 21.

The structure so far described is known in the art as a nozzle diaphragm for expanding elastic fluid and directing it to a bucket wheel. The elastic fluid may be received directly from the inlet of the turbine or from a preceding turbine stage. Fig. 5 shows the development of the partitions 12, 13, 14 and the inner ring 10. The partitions form passageways 22 through which elastic fluid flows during operation in the direction of the arrow 23. It is to be noted that the passages or the fluid paths are curved in the direction of flow of fluid. The curved flow is effected by the curved surfaces of the partitions, each partition having a front 24 concavely shaped in the direction of flow and a back 25 convexly shaped in the direction of flow. The general direction of flow is axial with reference to the axis of the turbine. In modern high pressure turbines elastic fluid is supplied to the first diaphragm at a high pressure of the order of 1200 pounds per square inch. As the elastic fluid flows through the passageways defined by the nozzle diaphragm it is expanded and consequently its pressure reduced. Thus, with regard to Fig. 5, a pressure of 1200 pounds per square inch will be set up at the inlet marked A of each passageway. This pressure of 1200 pounds per square inch drops to a pressure of 800 pounds per square inch as the fluid reaches the outlet of the nozzle which is marked B. This outlet on one side is defined by the tip or edge portion of the front 24 of one nozzle and by an intermediate portion of the back of another nozzle. As the fluid flows along the back of such other nozzle, its pressure is further decreased until it reaches at the back of the outlet edge of such a nozzle a pressure of, let us say, 400 pounds. Thus, it will be readily understood that the front of each nozzle is subject to a pressure ranging in intensity from 1200 pounds per square inch to 800 pounds per square inch, whereas the back of the outlet edge of each nozzle is subjected to a pressure ranging in intensity from 800 pounds per square inch to 400 pounds per square inch. This creates pressure differences ranging in intensity from 400 pounds per square inch to 600 pounds per square inch across the outlet edge of each nozzle and thereby sets up considerable bending stresses in such outlet edge. In an efficient turbine the outlet edges must be thin. Hence, the aforementioned stresses after a short time of operation at high temperature may effect bulging of the outlet edges, resulting in a change of the shape of the passageways from their original design and accordingly in a reduced efficiency of the turbine. To overcome this serious drawback in a nozzle diaphragm for expanding steam of 1200 pounds to about 600 pounds, it would ordinarily be necessary considerably to increase the thickness of the outlet edges with a substantial loss of efficiency. In accordance with my invention the thickening of the outlet edges of the partitions, blades or buckets defining passageways in a high pressure elastic fluid turbine is made unnecessary by curving the partitions, blades or buckets transversely to the direction of flow, more specifically, by shaping the front surface of each bucket concavely as regards the direction transverse to the flow and curving the back of each bucket convexly in the same direction of flow. Thus, as best shown in Figs. 2 and 3, each bucket in the present instance has a front 26 curved concavely in both the direction of flow 27a and transverse thereto as indicated by an arrow 27b. Each bucket has a back 28 curved convexly in both the direction of flow 29a and in the transverse direction 29b. With this arrangement both the back and the front of a partition, blade or bucket assume a cup or hammock shape, enabling it to sustain the imposed pressure differential by means of a direct tension in the transverse direction instead of by means of bending. With partitions, blades and buckets, especially their outlet edges, shaped in this manner the participation of the direct tension in the resulting stress system constitutes a much more efficient use of material and enables the use of much thinner outlet edges assuring at the same time that these edges may be safely subjected to considerable pressure differences without additional bulging beyond that contemplated and provided for in the design and difficulties in this respect are no longer encountered in the expansion of high pressure elastic fluid in the high pressure stage or stages of modern elastic fluid turbines. From another viewpoint, the buckets, partitions or blades are curved in both axial and radial direction. The curvature in radial direction is important only with regard to the thin exit or outlet portion of each blade or partition. This portion must be thin and hollowed or hammock-shaped. The other or principal blade portion on the other hand may have straight front and rear surfaces in radial direction. It is important that the other portion is substantially straight in radial direction in order to act as a strut between the inner and outer bands or like elements to which the ends of the partitions are secured. The ends of each partition are completely secured to said bands, that is, both the ends of the principal or thick partition portions and the ends of the thin hammock-shaped partition portions are both completely united with the inner and outer bands.

In the present instance the end portions of the partitions in the arrangement of Fig. 1 are disposed within holes punched into the inner and outer rings 10 and 11 respectively. It is difficult to punch holes to fit the thin outlet edges of the partitions. Therefore, in accordance with the present arrangement the holes are punched wider and the upper and lower ends of the partitions are provided with reinforcements 31 and 32 respectively defining shoulders 33 and 34 which mesh with the inner surfaces of the outer and inner rings 11 and 10 respectively. Holes may be easily punched into the rings 10, 11 to fit the reinforced or thickened end portion 31, 32 of the blades. Thus an elastic fluid turbine blade curved in the direction of flow of elastic fluid and having a thick inlet portion and a thin outlet portion is provided in accordance with my invention with ends which are reinforced or thickened at least near the thin outlet portion to permit welding of the blade to another element without injuring the thin outlet portion and also to facilitate the punching of bands with openings fitting the end portions of the blade.

Fig. 6 shows an application of my invention to a bucket wheel, that is, a rotary element defining passageways for expanding steam as may be used in reaction type turbines. The arrangement comprises a bucket wheel disk 35 to which is secured by means of welds 36 a blading structure including an inner ring 37 and an outer ring or shroud band 38 with a plurality of buckets or blades 39 having inner and outer end portions disposed within openings of the inner ring 37 and the outer ring 38 respectively and united therewith by welds 40 and 41. The blades or buckets 39 are curved in both axial and radial direction.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. An article of manufacture for use as a blade, partition or bucket in the formation of passageways for receiving, directing and expanding elastic fluid in elastic fluid turbines, such article of manufacture having a thick substantially straight inlet portion acting as a strut and an outlet portion hollowed transversely to the direction of flow and thin in comparison with the thickness of the inlet portion.

2. An elastic fluid turbine element for receiving, directing and expanding elastic fluid comprising inner and outer members with a plurality of blades having unrestricted end portions completely secured to said members to define a plurality of passageways, each blade having a thin outlet edge which edge is curved transversely to the direction of flow of fluid.

3. A blading structure defining a plurality of passageways for receiving and directing elastic fluid in elastic fluid turbines comprising a band having a plurality of uniformly spaced openings, and a plurality of blades, each blade being curved in the direction of flow and having a thick inlet portion and a thin outlet portion, the ends of the blades near the thin outlet portions being thickened and fitting the openings to facilitate punching of the openings and to permit welding of the ends of the blades to the band without injuring the thin outlet edges.

4. An elastic fluid turbine element for receiving and directing elastic fluid comprising inner and outer members with a row of blades held between them to define a plurality of passageways, each blade having a principal portion acting as a strut and a thin hammock-shaped outlet portion, the ends of both the principal and the outlet portion being completely united with the inner and outer members.

5. A blade for use in elastic fluid turbines to form part of passageways for elastic fluid, such blade being curved in the direction of flow of fluid and having a thick inlet portion and a thin outlet portion, the ends of the blade at least near the thin outlet portion being thickened to permit welding of the ends of the blade to another element without injuring the thin outlet portion.

ERNEST L. ROBINSON.